United States Patent
Park et al.

(10) Patent No.: US 7,020,269 B1
(45) Date of Patent: Mar. 28, 2006

(54) SPEED DIALING METHOD USING SYMBOLS IN COMMUNICATION TERMINAL HAVING TOUCH PAD

(75) Inventors: Jeon-Man Park, Kyongsangbuk-do (KR); Man-Gun Hur, Kyongsangbuk-do (KR); Hyun-Soo Kim, Kyongsangbuk-do (KR)

(73) Assignee: Samsung Electronics Co., Ltd., (KR)

( * ) Notice: Subject to any disclaimer, the term of this patent is extended or adjusted under 35 U.S.C. 154(b) by 562 days.

(21) Appl. No.: 09/649,325

(22) Filed: Aug. 28, 2000

(30) Foreign Application Priority Data

Aug. 26, 1999 (KR) ............................... 1999-35608

(51) Int. Cl.
*H04M 1/00* (2006.01)
*H04M 3/00* (2006.01)
*H04B 1/38* (2006.01)

(52) U.S. Cl. ........................ 379/355.01; 379/355.02; 379/355.06; 379/355.09; 455/564

(58) Field of Classification Search ............... 379/354, 379/355.01, 355.02, 355.05, 355.06, 355.09, 379/356.01, 355.07, 355.03, 355.04; 455/564, 455/565, 566
See application file for complete search history.

(56) References Cited

U.S. PATENT DOCUMENTS

| | | | | |
|---|---|---|---|---|
| 5,303,288 A | * | 4/1994 | Duffy et al. ................. | 455/564 |
| 5,414,457 A | * | 5/1995 | Kadowaki et al. ........ | 348/14.03 |
| 5,509,067 A | * | 4/1996 | Murata .................. | 379/355.09 |
| 5,548,634 A | * | 8/1996 | Gahang et al. .......... | 379/93.27 |
| 5,644,628 A | * | 7/1997 | Schwarzer et al. ...... | 379/93.19 |
| 5,684,873 A | * | 11/1997 | Tiilikainen ................. | 379/354 |
| 5,889,852 A | * | 3/1999 | Rosecrans et al. ..... | 379/355.05 |
| 6,351,655 B1 | * | 2/2002 | Tsuji et al. ................. | 455/564 |
| 2003/0059032 A1 | * | 3/2003 | Sato et al. ............. | 379/355.01 |

FOREIGN PATENT DOCUMENTS

| | | |
|---|---|---|
| CN | 1211891 | 3/1999 |
| EP | 0 858 202 A2 | 8/1998 |
| EP | 0 872 994 A1 | 10/1998 |
| GB | 2 306 078 A | 4/1997 |
| GB | 2 329 300 A | 3/1999 |
| GB | 2 351 202 A | 12/2000 |
| JP | 57-181255 | * 11/1982 |
| JP | 61-262347 | * 11/1986 |
| JP | 63-187850 | * 8/1988 |
| WO | WO 00/25501 | 5/2000 |

OTHER PUBLICATIONS

Chinese Office Action dated Dec. 20, 2002, issued in a counterpart application, namely Appln. No. 00126076.6.

* cited by examiner

*Primary Examiner*—Binh K. Tieu
(74) *Attorney, Agent, or Firm*—Dilworth & Barrese LLP

(57) ABSTRACT

A method for performing speed dialing using symbols in a communication terminal having a touch pad is disclosed. The method comprises registering a symbol in association with a phone number; comparing a symbol input by a user from the touch pad with the registered symbol; and reading, when the input symbol is identical to the registered symbol, said phone number registered in associated with the registered symbol and automatically dialing the read phone number. An error message, or a re-input request message, is displayed when the input symbol is not identical to a registered symbol.

11 Claims, 7 Drawing Sheets

| SYMBOL | PHONE NUMBER | NAME |
|---|---|---|
| ☆ | 02-777-7777 | HOME |
| ? | 017-219-0000 | OFFICE |
| □ | 0546-123-4567 | DAVID |
| ✓ | 0443-642-5555 | JHONE |

FIG. 6

| SYMBOL | FUNCTION |
|---|---|
| O | CALL CONNECT |
| X | CALL DISCONNECT |
| = | SAVE |

FIG. 7

SPEED DIALING METHOD USING SYMBOLS IN COMMUNICATION TERMINAL HAVING TOUCH PAD

PRIORITY

This application claims priority to an application entitled "Speed Dialing Method Using Symbols in Communication Terminal Having Touch Pad" filed in the Korean Industrial Property Office on Aug. 26, 1999 and assigned Serial No. 99-35608, the contents of which are hereby incorporated by reference.

BACKGROUND OF THE INVENTION

1. Field of the Invention

The present invention relates generally to a communication terminal having a touch pad, and in particular, to a method for registering phone numbers in association with specific symbols and then performing speed dialing using the symbols in a communication terminal having a touch pad.

2. Description of the Related Art

In general, communication terminals having a keypad employ speed dialing methods, such as one-touch or abbreviated dialing, in which a phone number is registered in association with a specific speed dialing key. When the specific speed dialing key is pressed, the phone number is dialed.

In contrast, a communication terminal having only a touch pad or touch screen without a keypad employs one of the dialing methods stated below.

First, a numeric pad is displayed on the touch pad so that the user can touch positions of the displayed numbers to input a phone number.

Second, the user writes the phone number to be dialed on the touch pad, and the communication terminal recognizes the phone number by analyzing the touch locations of the written number on the touch pad and then dials the phone number.

Third, the communication terminal dials a phone number using a phonebook memory in which phone numbers were previously stored.

Fourth, the communication terminal dials a phone number using a voice recognition dialing method.

The above-stated conventional dialing methods other than the fourth dialing method are inconvenient to the user, as compared with the existing speed dialing method used in the communication terminal having a keypad. That is, the existing communication terminal having a touch pad does not employ a speed dialing method, thereby causing inconvenience to the user when dialing.

SUMMARY OF THE INVENTION

It is, therefore, an object of the present invention to provide a method for performing speed dialing using symbols in a communication terminal having a touch pad.

It is another object of the present invention to provide a method for registering a phone number in association with a specific symbol and then automatically dialing the registered phone number by inputting (or touching) the associated symbol in a communication terminal having a touch pad.

To achieve the above objects, there is provided a method for performing speed dialing using symbols in a communication terminal having a touch pad. The method comprises registering a phone number in association with a specific symbol; comparing a symbol input by a user from the touch pad with the registered symbol; and reading, when the input symbol is identical to the registered symbol, said phone number registered in associated with the symbol and automatically dialing the read phone number. Further, an error message is displayed when the input symbol is not identical to the registered symbol.

BRIEF DESCRIPTION OF THE DRAWINGS

The above and other objects, features and advantages of the present invention will become more apparent from the following detailed description when taken in conjunction with the accompanying drawings in which:

FIG. 6 is a diagram illustrating a map of a phonebook memory for storing speed dialing information according to an embodiment of the present invention; and FIG. 7 is a diagram illustrating an exemplary method for registering several functions in association with specific symbols according to an embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
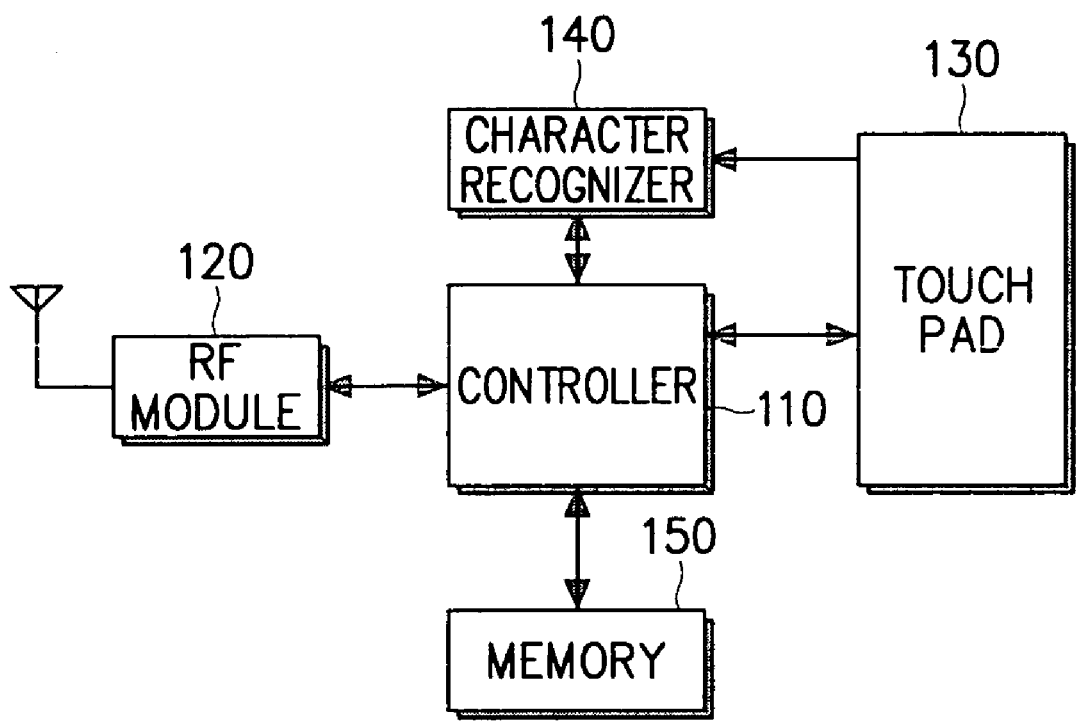
FIG. 1 is a block diagram of a radio communication terminal having a touch pad according to the preferred embodiment of the present invention.

FIG. 1 shows a block diagram of a radio communication terminal according to the preferred embodiment of the present invention. Here, an RF (Radio Frequency) module 120 comprises an RF processor for primarily processing an input RF signal, an IF (Intermediate Frequency) processor for converting the RF signal to an IF signal, and a baseband processor for converting the IF signal to a baseband bit stream which a controller 110 can process. Further, though not illustrated, the RF module 120 is divided into a receiver and a transmitter. The receiver in the RF module 120 amplifies the input RF signal while suppressing noise, and converts the amplified signal to a digital signal after IF processing. The digital signal is provided to the controller 110. The transmitter in the RF module 120 amplifies the signals provided from the controller 110 after performing modulation according to frequency bands, and radiates the signals through a undepicted duplexer and an antenna.

Figure 2A:
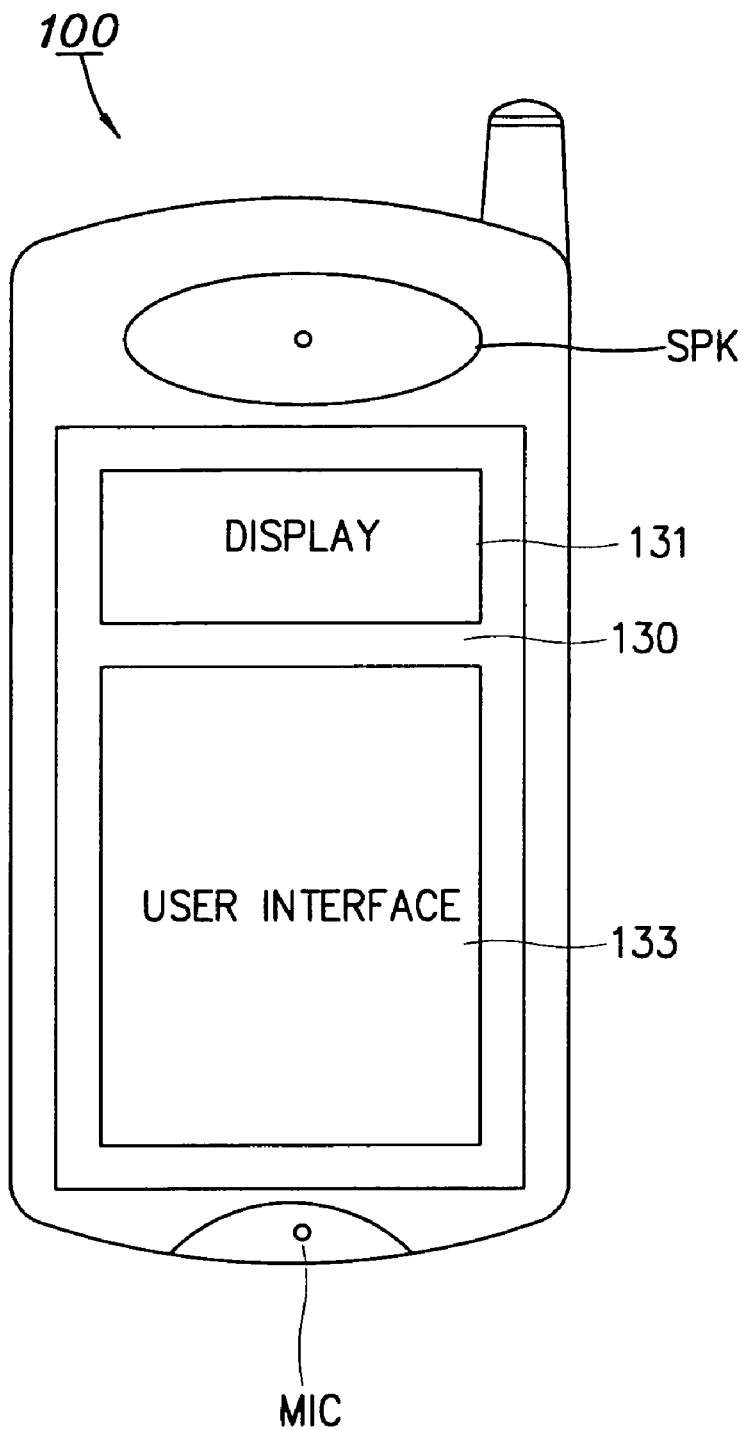
FIG. 2A is a diagram illustrating a communication terminal having a touch pad according to an embodiment of the present invention.
Figure 2B:
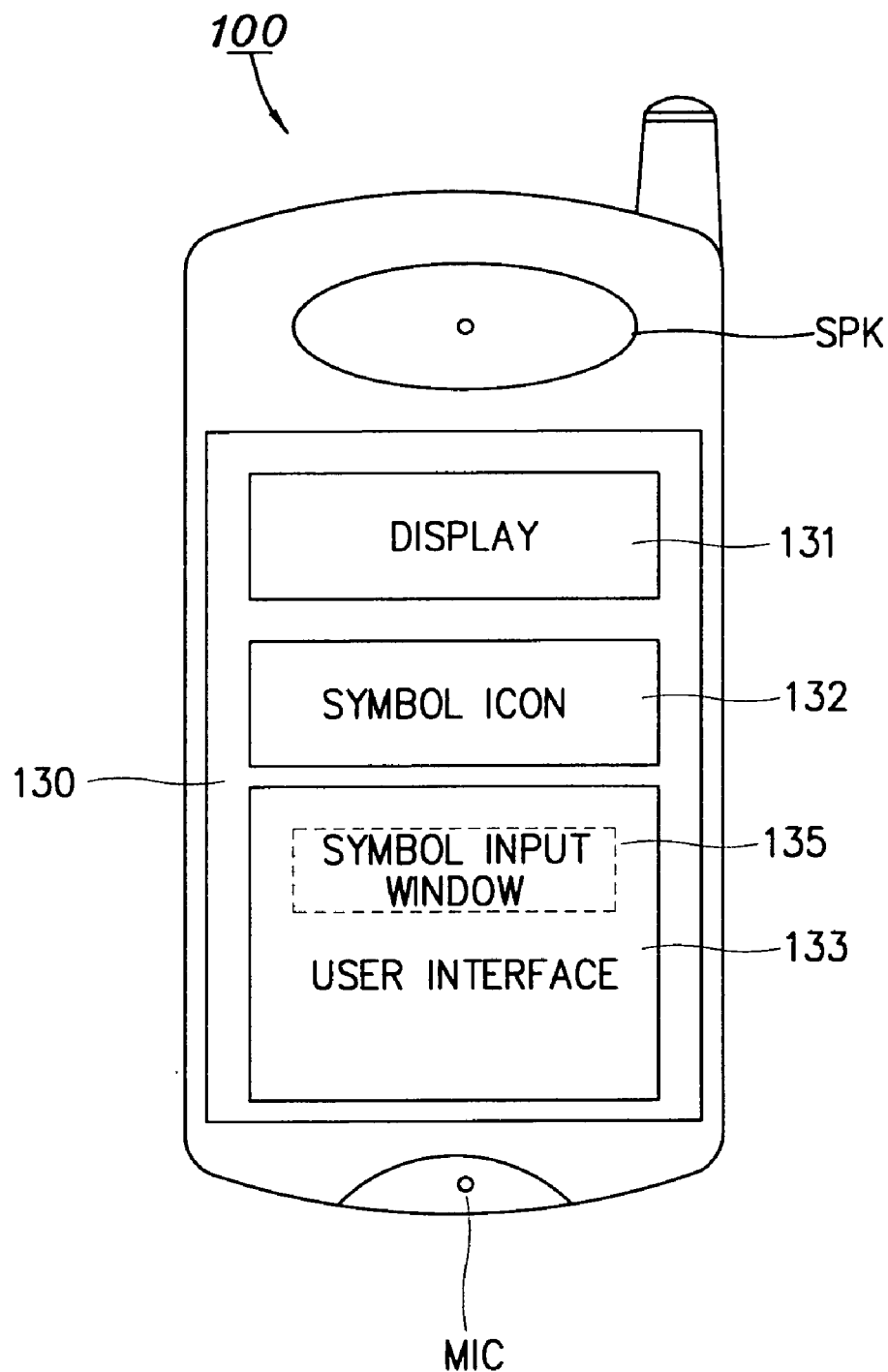
FIG. 2B is a diagram illustrating another communication terminal having a touch pad according to another embodiment of the present invention.

The controller 110 controls the overall operation of the radio communication terminal and processes a protocol defined by IS-95A. In particular, the controller 110 recognizes a symbol input to a touch pad 130, and automatically dials the phone number, if any, registered in association with the symbol. The touch pad 130, which can be implemented as shown in FIG. 2A or 2B, includes a user interface 133 with which the user can input numbers, characters and symbols. The touch pad 130 provides the input number, character and symbol signals to the controller 110, and displays the corresponding numbers, characters and symbols on a display 131 thereof under the control of the controller 110.

In one example, the touch pad 130 shown in FIG. 2A includes the display 131 and the user interface 133, and displays corresponding display data on the display 131 under the control of the controller 110. Further, the touch pad 130 receives numbers, characters and symbols that the user inputs through the user interface 133 using a pen. In another example, the touch pad 130 shown in FIG. 2B includes the display 131, a symbol icon part 132, the user interface 133 and a symbol input window 135, and activates the symbol input window 135 when the user touches a specific icon, prepared in the symbol icon part 132, for opening the symbol input window 135. A speed dialing method using the touch pad shown in FIG. 2A or 2B will be described with reference to FIGS. 3 to 7.

Returning to FIG. 1, a character recognizer 140 recognizes touch patterns of the numbers, characters and symbols input through the touch pad 130 and provides the recognized results to the controller 110. A memory 150 stores necessary control data and a control program for the controller 110, and is comprised of a ROM (Read Only Memory) for storing various control programs, a nonvolatile memory for storing the phone numbers and names, and a RAM (Random Access Memory) for temporarily storing data generated during the control program. The nonvolatile memory of the memory 150 according to an embodiment of the present invention has a memory map as shown in FIG. 6, in which phone numbers and their associated names are stored in association with user defined symbols which are entered by the user and agreed symbols which are pre-stored.

Now, a detailed description of the present invention will be made with reference to FIGS. 1 to 7.

Figure 3:
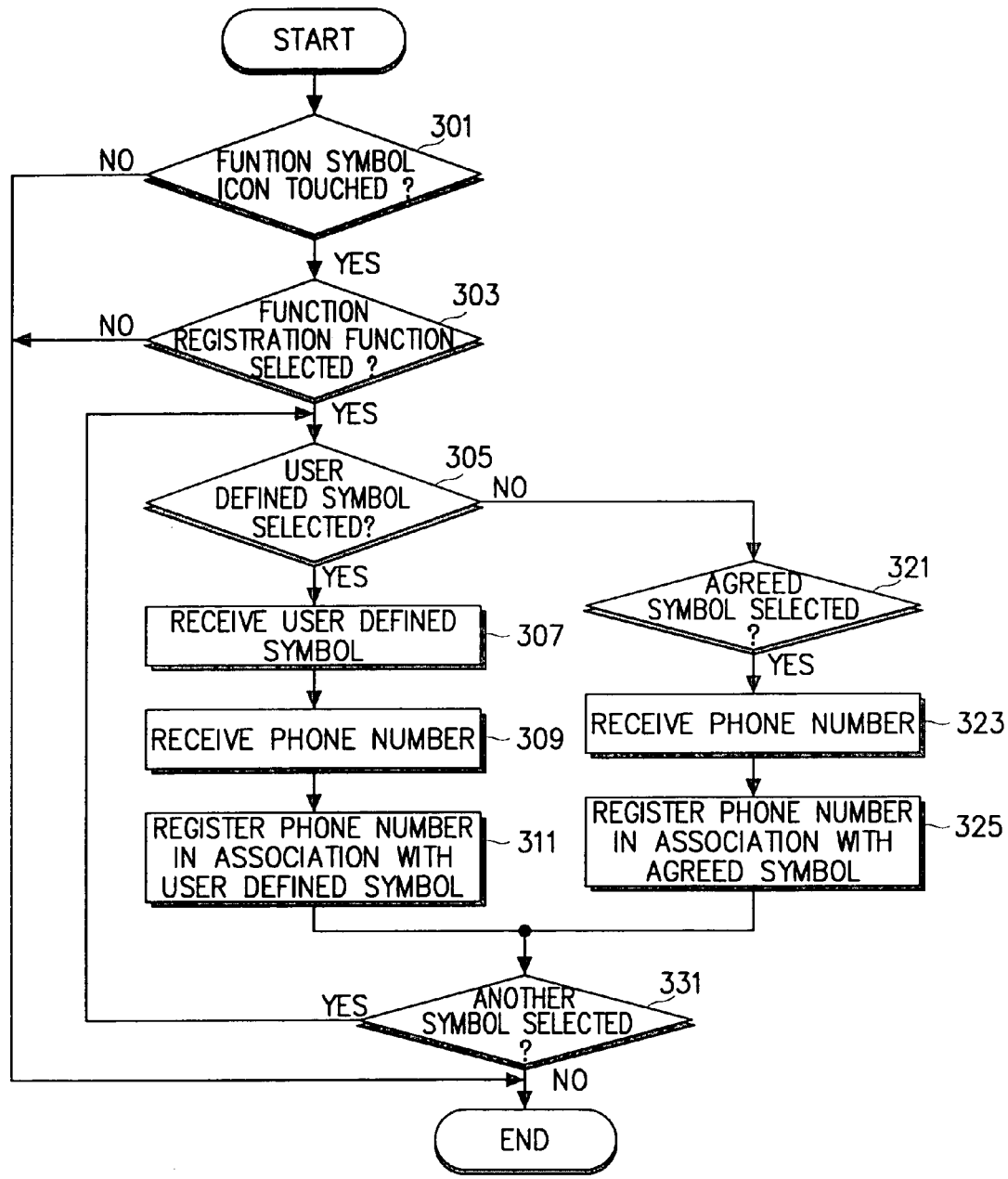
FIG. 3 is a flow chart illustrating a procedure for registering a phone number in association with a specific symbol in a communication terminal having a touch pad according to an embodiment of the present invention.

Referring first to FIG. 3, a description will be made of a method for registering phone numbers in association with specific symbols according to an embodiment of the present invention. It will be assumed herein that the touch pad 130 shown in FIG. 2B is used.

In step 301, the controller 110 determines whether the user has touched a function symbol icon displayed on the symbol icon part 132 of the touch pad 130, by detecting a symbol icon touch signal. When the function symbol icon is touched by the user, the controller 110 displays a function menu for the touched function symbol icon on the touch pad 130. At this point, the controller 110 can display the function menu either on the display 131 or on the symbol icon part 132 using separate icons. Thereafter, the controller 110 determines in step 303 whether the user has selected a symbol registration function. When the symbol registration function is selected by the user, the controller 110 displays sub-menus for the symbol registration function, i.e., a user defined symbol menu and an agreed symbol menu. In step 305, the controller 110 determines whether the user has selected the user defined symbol menu or the agreed symbol menu. When the user defined symbol menu is selected, the controller 110 proceeds to step 307. If the user defined symbol menu is not selected, the controller proceeds to step 321. Here, user defined symbol refers to the symbols, such as an asterisk, a question mark and a rectangular that the user writes or draws on the user interface 133 of the touch pad 130 using a pen, and agreed symbol refers to the symbols that the communication terminal provides.

In step 307, the controller 110 is provided with a user defined symbol from the user through the user interface 133. After receiving the user defined symbol from the user, the controller 110 receives a phone number through a numeric pad displayed on the touch pad 130 or the user interface 133, in step 309. Thereafter, in step 311, the controller 110 registers the received phone number in the phonebook of FIG. 6 in association with the received user defined symbol.

However, if the user defined symbol is not selected in step 305, the controller 110 determines in step 321 whether an agreed symbol is selected or not. When the agreed symbol is selected, the controller 110 receives a phone number through the numeric pad displayed on the touch pad 130 or the user interface 133, in step 323. Thereafter, in step 325, the controller 110 registers the received phone number in the phonebook of FIG. 6 in association with the received agreed symbol.

After the registration process of steps 311 or 325, the controller 110 determines in step 331 whether or not the user has selected another symbol. If another symbol is selected by the user, the controller 110 returns to step 305 to repeat the process. Otherwise, if another symbol is not selected, the controller 110 ends the registration procedure.

It is also possible to register a phone number in association with a combination of at least two symbols.

Figure 4:
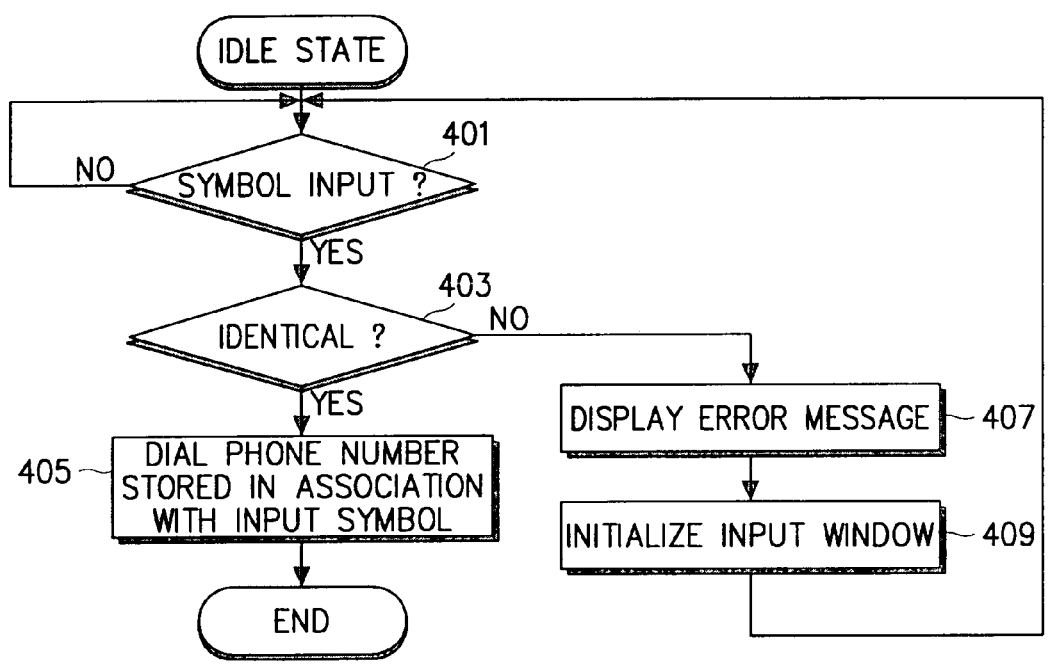
FIG. 4 is a flow chart illustrating a procedure for performing speed dialing using a symbol according to an embodiment of the present invention.

FIG. 4 shows a procedure for performing speed dialing using the registered symbols, wherein the touch pad 130 is assumed to have the structure of FIG. 2A.

Referring to FIG. 4, the controller 110 examines in step 401 whether the user has input (or touched) a symbol using the user interface 133 of the touch pad 130. Upon detection of a symbol input, the controller 110 determines in step 403 whether the input symbol is identical to any one of the registered symbols, by recognizing a touch pattern of the input symbol using the character recognizer 140 and comparing the recognized input symbol with the registered symbols. If there is a registered symbol identical to the input symbol, the controller 110 proceeds to step 405, and, if not, the controller 110 proceeds to step 407.

In step 405, the controller 110 reads the phone number associated with the input symbol from the phonebook in the memory 150, and dials the read phone number. On the other hand, in step 407, the controller 110 displays an error message indicating that there is no registered symbol identical to the input symbol or a symbol re-input request message on the display 131 of the touch pad 130. After step 407, in step 409, the controller 110 initializes an input window of the user interface 133 and returns to step 401.

In sum, when the user inputs a symbol through the user interface 133 of the touch pad 130 in an idle mode, the controller 110 determines whether there is a registered symbol identical to the input symbol. When the input symbol is identical to the registered symbol, the controller 110 automatically dials a phone number stored in association with the input symbol. For example, when the user inputs the question mark '?' through the user interface 133 in the idle state, the controller 110 recognizes the input symbol by analyzing a touch pattern of the input symbol using the character recognizer 140, and then examines whether the phonebook in the memory 150 has a registered symbol of the question mark. When the phonebook has a registered symbol of the question mark as shown in FIG. 6, the controller 110 dials the phone number '017-219-0000' stored in association with the question mark. In this manner, the user can dial a desired phone number by drawing a symbol on the touch pad 130 in the idle state.

Figure 5:
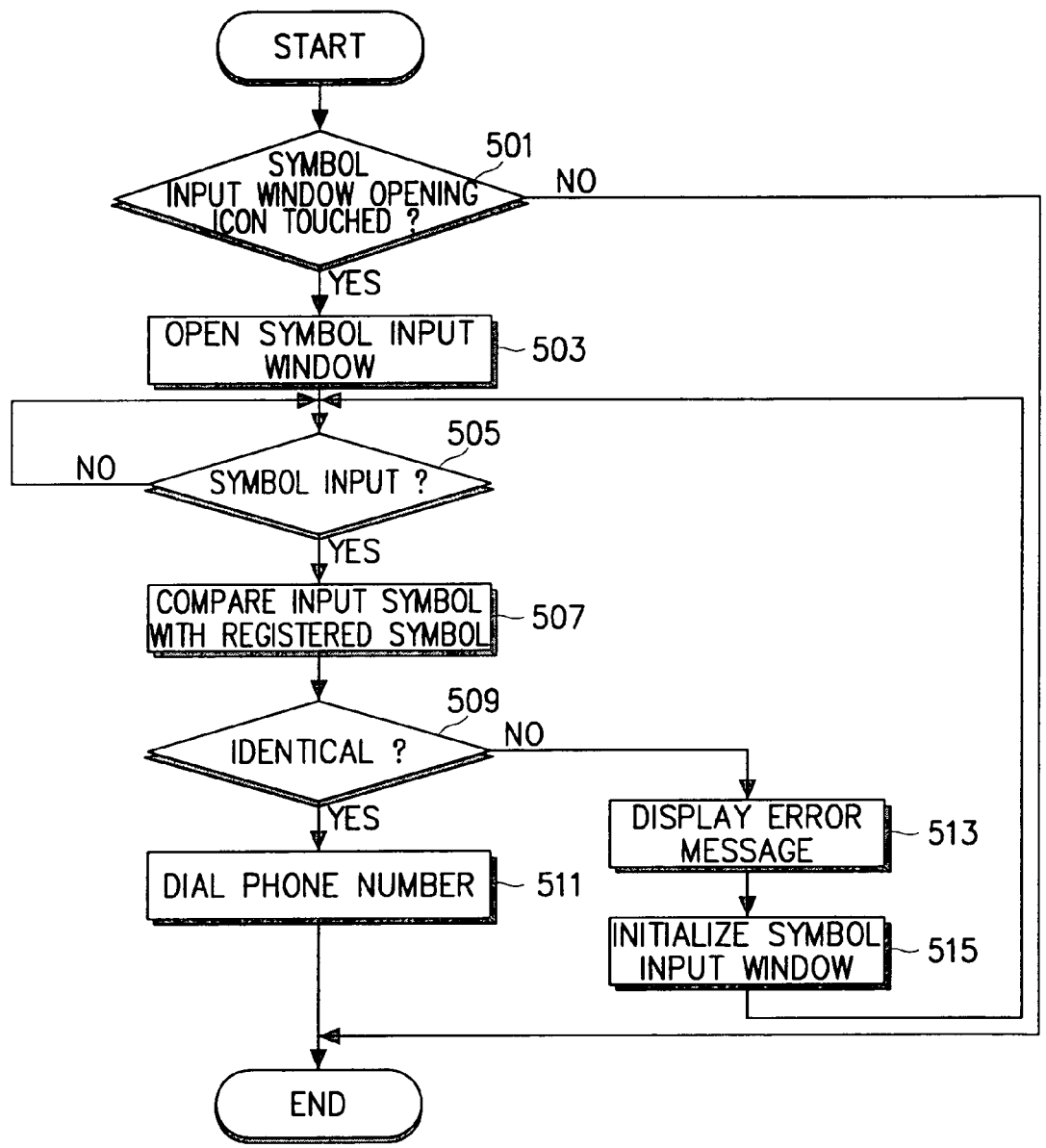
FIG. 5 is a flow chart illustrating a procedure for performing speed dialing using a symbol according to another embodiment of the present invention.

FIG. 5 shows a procedure for performing speed dialing using the registered symbols according to another embodiment of the present invention, wherein the touch pad 130 is assumed to have the structure of FIG. 2B.

Referring to FIG. 5, the controller 110 determines in step 501 whether the user has touched a symbol input window opening icon on the symbol icon part 132 of the touch pad 130. If the symbol input window opening icon is touched by the user, the controller 110 opens the symbol input window 135 in a predetermined area of the user interface 133 in step 503. The symbol input window 135 is exclusively used for inputting a symbol.

Thereafter, in step 505, the controller 110 examines whether the user has input a symbol through the symbol input window 135. Upon detection of a symbol input, the controller 110 recognizes a touch pattern of the input symbol using the character recognizer 140 and compares the recognized input symbol with the registered symbols, in step 507. The controller 110 then examines in step 509 whether the input symbol is identical to any one of the registered symbols. If there is a registered symbol identical to the input symbol, the controller 110 proceeds to step 511 and, if not, the controller 110 proceeds to step 513.

In step 511, the controller 110 reads the phone number associated with the input symbol from the phonebook in the memory 150, and dials the read phone number. Meanwhile, in step 513, the controller 110 displays an error message indicating that there is no registered symbol identical to the input symbol or a message requesting symbol re-input on the display 131 of the touch pad 130. Thereafter, in step 515, the controller 110 initializes the symbol input window 135 of the user interface 133 and returns to step 505.

In sum, when the user touches the symbol input window opening icon on the symbol icon part 132 of the touch pad 130 in the idle mode, the controller 110 displays the symbol input window 135 in a predetermined area of the user interface 133. When the user draws a symbol on the symbol input window 135, the controller 110 determines whether there is a registered symbol identical to the input symbol. If the input symbol is identical to the registered symbol, the controller 110 automatically dials the phone number stored in association with the input symbol.

Although the invention has been described with reference to the speed dialing method using the user defined symbols, the invention can be equally applied to a speed dialing method using the agreed symbols.

In the embodiment, when there exists a registered symbol identical to the user input symbol, the phone number registered in association with the symbol is automatically dialed. However, as an alternative embodiment, when there exists a registered symbol identical to the user input symbol, it is possible to display the phone number associated with the input symbol on the display 131 and then determine whether the user inputs another symbol. If the user inputs a connect symbol (e.g., 'O' in FIG. 7), the controller 110 dials the displayed phone number. However, if user sequentially inputs a symbol for a phone number and the connect symbol, the controller 110 automatically dials the phone number registered in association with the input symbol. Further, if the user inputs a disconnect symbol (e.g., 'X' in FIG. 7) during a call, the controller 110 disconnects the call. In addition, when the user inputs a save symbol (e.g., '=' in FIG. 7), the controller 110 saves the phone number presently in service or saves a user input symbol in the symbol registration process.

As described above, the novel communication terminal having a touch pad can perform speed dialing using symbols without a key matrix, thereby contributing to the convenience of the user.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing speed dialing using symbols in a communication terminal having a touch pad, comprising the steps of:
   registering a phone number in association with a user-defined symbol, which a user has defined by one of drawing and writing the symbol using the touch pad;
   comparing a symbol input by the user on the touch pad with a registered symbol;
   reading, when the input symbol is identical to a registered symbol, a phone number registered in association with the registered symbol; and
   dialing automatically the read phone number.

2. The method as claimed in claim 1, further comprising the step of:
   displaying an error message when the input symbol is not identical to a registered symbol.

3. The method as claimed in claim 1, further comprising the step of:
   displaying a re-input request message when the input symbol is not identical to a registered symbol.

4. The method as claimed in claim 1, further comprising the step of:
   registering a phone number in association with a symbol that is pre-stored in the communication terminal.

5. A method for performing speed dialing using symbols in a communication terminal having a touch pad, comprising the steps of:
   registering, by the user, a symbol in association with a phone number;
   registering, by a user, a call connect symbol that is a user-defined symbol, which the user has defined by one of drawing and writing the symbol using the touch pad;
   reading, upon input of a symbol identical to a registered symbol and then the call connect symbol in sequence, a phone number registered in association with the registered symbol;
   dialing the read phone number according to the call connect symbol.

6. The method as claimed in claim 5, further comprising the step of:
   displaying an error message when the input symbol is not identical to a registered symbol.

7. The method as claimed in claim 5, further comprising the step of:
   displaying a re-input request message when the input symbol is not identical to a registered symbol.

8. The method as claimed in claim 5, further comprising the step of:
   registering a phone number in association with a symbol that is pre-stored in the communication terminal.

9. A method for performing speed dialing using symbols in a communication terminal having a touch pad, said touch pad including a symbol icon part providing a symbol registration icon, a symbol input window opening icon and a plurality of pre-stored symbols, a user interface and a symbol input window, said communication terminal having a plurality of pre-stored symbols, the method comprising the steps of:

- entering a symbol registration mode when the symbol registration icon is touched;
- registering, when in symbol registration mode, a phone number in association with a user-defined symbol, which the user has defined by one of drawing and writing the symbol using the touch pad;
- opening the symbol input window when the symbol input window opening icon is touched;
- comparing a symbol input by the user in the symbol input window with a registered symbol; and
- reading, when the input symbol is identical to a registered symbol, a phone number registered in association with the registered symbol; and
- dialing automatically the read phone number.

10. The method as claimed in claim 9, further comprising the step of:

- displaying an error message when the input symbol is not identical to a registered symbol.

11. The method as claimed in claim 10, wherein a combination of at least two symbols is registered in association with a phone number.

* * * * *